UNITED STATES PATENT OFFICE.

EDMUND STIASNY, OF HEADINGLEY, LEEDS, ENGLAND, ASSIGNOR TO BADISCHE ANILIN & SODA FABRIK, OF LUDWIGSHAFEN-ON-THE-RHINE, GERMANY, A CORPORATION.

TANNING.

1,232,620.   Specification of Letters Patent.   Patented July 10, 1917.

No Drawing.   Application filed December 13, 1912.   Serial No. 736,508.

*To all whom it may concern:*

Be it known that I, EDMUND STIASNY, subject of the Emperor of Austria, residing at Headingley, Leeds, England, have invented new and useful Improvements in Tanning, of which the following is a specification.

I have found that the soluble aromatic compounds which can be obtained from formaldehyde (or bodies giving rise to formaldehyde) and aromatic phenols, or their derivatives, which compounds contain at least one hydroxyl group in the molecule but not more than one hydroxyl group in each nucleus, and which also contain one or more than one acid salt-forming group, possess a distinct character as tanning agents and are consequently of great practical value. The condensation products of the kind referred to can be obtained, for instance, if the initial materials mentioned, for instance, formaldehyde and phenols, or phenol-sulfonic acids, or phenol-carboxylic acids, or mixtures of phenols and phenol-sulfonic acids, be caused to react upon one another either in the absence of a condensation agent, or in the presence of a condensation agent, such for example as sulfuric acid, hydro-chloric acid, or the like. The condensation can be effected in such a manner that suitable products soluble in water are principally obtained. If the phenol, or phenol-carboxylic acid, or phenol-sulfonic acid, be first condensed with formaldehyde so that insoluble, or difficultly soluble, products are principally obtained, then these bodies whether they be oily or resinous, in their character, must be treated with sulfonating agents. Although I have indicated the means by which the aforesaid bodies can be obtained, my invention is not restricted to the use of bodies obtained in the ways indicated, as these methods are given in order better to define the products to be employed in carrying out the invention by mentioning the methods of formation which appear to be of the greatest practical importance.

The production of some compounds which can be employed for tanning according to this invention is described in the specification of my application, Serial No. 716,020, filed August 21st, 1912.

The compounds used according to this invention may be employed in the presence, or in the absence, of other tanning agents.

The following is an example of how this invention can be performed, but it is not confined to this example. The parts are by weight.

For the production of a tanning solution, dissolve, in water, the condensation product such as can be obtained by treating 50 parts of formaldehyde solution (containing 30% by weight) with 188 parts of cresol-sulfonic acid at a temperature not exceeding 35° C. Add to the solution sufficient alkali to neutralize it partly, so that 10 grams of the mass require 10 ccm. of normal caustic soda solution for complete neutralization. Dilute a portion of the product thus obtained until it has a strength of 0.6° Bé. and introduce into this solution the hides to be tanned which should be well limed and bated. Add to the tanning vat, from time to time, sufficient of the aforesaid solution of the condensation product to bring the strength of the vat gradually, within 10 days, up to 5° Bé. The hides will be fully tanned within 14 days. The leather thus obtained is freed from acid, treated with fat and dried in the well known, or any suitable, way.

Now what I claim is:—

1. The process of tanning which consists in treating hides with a soluble aromatic compound obtainable from formaldehyde or a body giving rise to formaldehyde and a phenolic body, and which compound contains at least one hydroxyl group in the molecule, but not more than one hydroxyl group in each nucleus, and which also contains one or more than one acid salt-forming group.

2. The process of tanning which consists in treating hides with a soluble aromatic compound obtainable by treating cresol-sulfonic acid with formaldehyde.

In testimony whereof I have hereunto set my hand in the presence of two subscribing witnesses.

EDMUND STIASNY.

Witnesses:
 CHARLES F. PALMER,
 JAS. S. BIRDSALL.